(12) United States Patent
Hori (10) Patent No.: US 6,402,396 B2
(45) Date of Patent: Jun. 11, 2002

(54) FILM BACK EXCHANGEABLE CAMERA AND EXCHANGEABLE FILM BACK

(75) Inventor: Masakatsu Hori, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/757,463

(22) Filed: Jan. 11, 2001

(30) Foreign Application Priority Data

Jan. 13, 2000 (JP) ........................................ 2000-004429

(51) Int. Cl.$^7$ .......................... G03B 1/00; G03B 17/26; G03B 17/02; G03B 19/12
(52) U.S. Cl. ........................ 396/511; 396/513; 396/387; 396/388; 396/518; 396/535; 396/538; 396/512; 396/355
(58) Field of Search ................................. 396/387, 388, 396/390, 511, 513, 517, 518, 524, 535, 537, 437, 263, 512, 355, 373, 414, 48, 502, 448, 360, 296

(56) References Cited

U.S. PATENT DOCUMENTS

| | | | |
|---|---|---|---|
| 4,017,182 A | * | 4/1977 | Robbins ...................... 226/93 |
| 5,079,574 A | | 1/1992 | Ueno |
| 5,179,478 A | | 1/1993 | Aoki |
| 5,298,930 A | * | 3/1994 | Asakura et al. ............. 396/155 |
| 6,035,147 A | | 3/2000 | Kurosawa |

* cited by examiner

Primary Examiner—Russell Adams
Assistant Examiner—Andrew Sever
(74) Attorney, Agent, or Firm—Greenblum & Bernstein, P.L.C.

(57) ABSTRACT

A film back exchangeable camera has a camera body and a film back that can be attached to and detached from the camera body. The camera includes: an aperture formed in the film back, through which photographing light flux passes; a film supplying mechanism that moves a film along a film running surface defined at a rear of the aperture; a shielding member, which is built in the film back and located movably in front of the film running surface and which is movable between a shielding state where a film is not exposed to light and a light transmissible state where the light is transmissible to the film to expose the film; a shielding member driving mechanism that moves the shielding member from the shielding state to the light transmissible state; a forward/reverse rotation motor; and a motor linking switch mechanism by which the forward/reverse rotation motor is switchingly linked with either one of the film supplying mechanism and the shielding member driving mechanism according to a forward rotation and a reverse rotation of the forward/reverse rotation motor. The film supply is executed by the forward rotation of the forward/reverse rotation motor, and the shielding member is moved from the shielding state to the light transmissible state by the reverse rotation of the forward/reverse rotation motor.

11 Claims, 4 Drawing Sheets

FILM BACK DETACHED STATE
(PHOTOGRAPHING INHIBITED STATE)

FILM BACK ATTACHED STATE
(PHOTOGRAPHING POSSIBLE STATE)

FILM BACK EXCHANGEABLE CAMERA AND EXCHANGEABLE FILM BACK

BACKGROUND OF THE INVENTION

The present invention relates to a camera in which a film back can be attached to and detached from a camera body, and an exchangeable film back, and particularly to a film back exchangeable camera and an exchangeable film back which have a film shielding function.

In a film back exchangeable camera in which a film back can be attached to and detached from a camera body, a shielding means is used in order to optically shield an interior of the film back when the film back is not attached to the camera body. A typical shielding means, which is widely used, is arranged such that a shielding plate is inserted into a slit provided to the film back. The shielding means of this type imposes a troublesome work since a photographer must detach the shielding plate after the film back is attached to the camera body. Further, the photographer is likely to fail to detach the shielding plate. The film back exchangeable camera is generally designed to establish a release lock state to inhibit photographing in a case where the shielding plate is not detached. However, in this constitution, the photographer is not aware that he has failed to detach the shielding plate until the release operation is actually performed. Therefore, many shutter release moments are frequently missed. Further, the shielding plate separate from the film back is likely to be lost.

SUMMARY OF THE INVENTION

The invention has been made in view of the above problems, and an object of the invention is to provide a film back exchangeable camera and/or an exchangeable film back, which can reduce a load on the photographer in connection with the shielding function of the film back and which is free from the lost of the shielding member.

In order to attain the above-noted object, the invention provides an arrangement for selectively establishing a shielding state and a light transmissible state (photographable state) with a shielding member built in a film back, according to attachment and detachment of the film back to a camera body.

A preferred embodiment of the present invention is a camera having a camera body and a film back that can be attached to and detached from the camera body The camera includes: an aperture formed in the film back, through which photographing light flux passes; a film supplying mechanism that moves a film at a rear of the aperture; a shielding member, which is built in the film back and located movably in front of a film running surface in the rear of the aperture and which is movable between a shielding state where a film is not exposed to light and a light transmissible state where the shielding is released and the film exposure is permitted; a shielding member driving mechanism for driving this shielding member from the shielding state to the light transmissible state; a forward/reverse rotation motor; and a motor linking switch mechanism by which the forward/reverse rotation motor is switched to be linked with the film supplying mechanism and the shielding member driving mechanism according to the forward rotation and the reverse rotation of the forward/reverse rotation motor. In the camera, the film supply is executed by the forward rotation of the forward/reverse rotation motor, and the shielding member is actuated from the shielding state to the light transmissible state by the reverse rotation of the same. According to this constitution, since the shielding member can be operated from the shielding state to the light transmissible state by the driving force of the motor used for the film supply, the load that the photographer operates the shielding member can be eliminated. Further, since the shielding member is built in the film back, there is no fear that it may be lost. The film supply executed by the forward rotation of the forward/reverse rotation motor is taken, for example, as a film winding-up.

It is desirable in this film back exchangeable camera that a shielding member energizing means for energizing the shielding member to the shielding state is provided. Under this constitution, when the light transmissible state is switched to the shielding state, the load that the photographer operates the shielding member can be also eliminated. Further, by the energizing means, quick shielding can be performed; and even if the motor or the power source malfunctions, the shielding member is operated without any problems. Therefore, the undesired film exposure can be prevented.

Regarding the concrete constitution in which the shielding member is built in the film back, the following constitution is preferable. The shielding member is constituted as a curtain-shaped member having a light transmissible portion of a size corresponding to a size of the aperture of the film back. Further, the film back includes a first winding shaft to which one end portion of the shielding member is fixed and which is rotatingly energized by the shielding member energizing means in a direction where the shielding member is wound up; and a second winding shaft to which the other end of the shielding member is fixed and which is rotated by the reverse rotation of the forward/reverse motor in a direction where the shielding member is wound up. And, when the shielding member is wound up on the first winding shaft, the light transmissible portion retreats from the forward position of the film running surface and the film back enters into the shielding state; and when the shielding member is wound up on the second winding shaft, the light transmissible portion is located in the front of the film running surface and the film back enters into the light transmissible state.

It is preferable that the motor linking switch mechanism is provided with a planet gear selectively meshing with a gear on the film supplying mechanism side and a gear on the shielding member driving mechanism side according to the forward rotation and reverse rotation of the forward/reverse rotation motor.

It is further desirable that in the above-described film back exchangable camera, there are provided lock means for locking the film back in the camera body in a state where the former is mounted on the latter; and a lock linking keeping means which keeps a lock state where the film back is locked in the camera body by the lock means, so that even if the reverse rotation of the forward/reverse rotation motor is stopped, the shielding member is kept in the light transmissible state, and in case of an unlock state of the lock means, keeping is released and the operation of the shielding member from the light transmissible state to the shielding state is permitted. This constitution is particularly effective in case that the-shielding member is energized in the shielding direction by the above shielding member energizing means. During photographing with the film back attached to the camera body, even if the forward/reverse motor is not driven, the light transmissible state can be kept; and also the shielding member can be switched to the shielding state as soon as the lock of the film back is released.

The lock means can be composed of a fitting hook provided to the camera body, which enters into the film back when the film back is attached; a movable lock member, which can be moved in a lock position Where it is fitted to the fitting hook and in an unlock position where fitting is released, and which is provided in the film back; and lock member energizing means for energizing the movable lock member to be moved to the lock position. The lock linking keeping means can be composed of a cam gear which rotates in a predetermined direction when it is linked with the reverse rotation of the forward/reverse rotation motor thereby to operate the shielding member to the light transmissible state, and which is driven and rotated in the opposite direction to the direction at the motor linked state when the shielding member is operated from the light transmissible state to the shielding state; and a fitting lever which can be rotated between a fitting position where the driven-rotation of the cam gear in the opposite direction to the direction at the motor cooperating time is restricted and a fitting release position where the rotational regulation is released, and which is kept in the fitting position when the movable lock member is in the lock position, and rotated to the fitting release position by the movement of the movable lock member in the unlock direction. In this case, the fitting lever can be controlled with the simple constitution if the lock member and the lock linking keeping means are so constituted that when the cam gear rotates in linking with the reverse rotation of the forward/reverse rotation motor, the fitting lever is pressed by the cam gear and rotated to the fitting release position, and when the cam gear performs one rotation, the fitting lever returns to the fitting position.

In case that the lock means and the lock linking keeping means are constituted as described above, it is preferable to provide a first switch for detecting the fitting position and fitting release position of the fitting lever; a second switch for detecting the lock position and unlock position of the movable lock member; a third switch for detecting the entry of the fitting hook on the camera body side into the fitting position to the movable lock member; and control means which, on condition that the fitting position of the fitting lever, the lock position of the movable lock member, and the entry of the fitting hook are simultaneously detected by these switches, executes the reverse rotation of the forward/reverse rotation motor and operates the shielding member to the light transmissible state. By this constitution, only in case that the film back is exactly attached to the camera body, the shielding state can be released, so that the occurrence of the unprepared shielding release operation can be prevented.

The invention also relates to an exchangeable film back that can be attached to and detached from a camera body. This film back comprises an aperture through which camera light flux passes; film supplying mechanism that moves a film at the rear of the aperture; a shielding member, which is movably located forward of a film running surface in the rear of the aperture and which can move from a shielding state where the film is not exposed to light and to a light transmissible state where the shielding is released and the film exposure is permitted; shielding member driving mechanism for driving this shielding member from the shielding state to the light transmissible state; and motor linking switch mechanism which is driven by rotation of a forward/reverse rotation motor, and selects the film supplying mechanism or the shielding member driving mechanism according to its forward rotation and reverse rotation thereby to actuate the selected mechanism. Andy this film back is characterized in that the film supply is executed by the forward rotation of the forward/reverse rotation motor, and the shielding member is actuated from the shielding state to the light transmissible state by the reverse rotation of the same. In this exchangeable film back, also, it is desirable that a shielding member energizing means for energizing the shielding member to the shielding state is provided similarly to the aforesaid camera.

The present disclosure relates to the subject matter contained in Japanese patent application No. 2000-4429 (filed on Jan. 13, 2000), which is expressly incorporated herein by reference in its entirety.

DESCRIPTION OF THE PREFERRED EMBODIMENT

Figure 1:
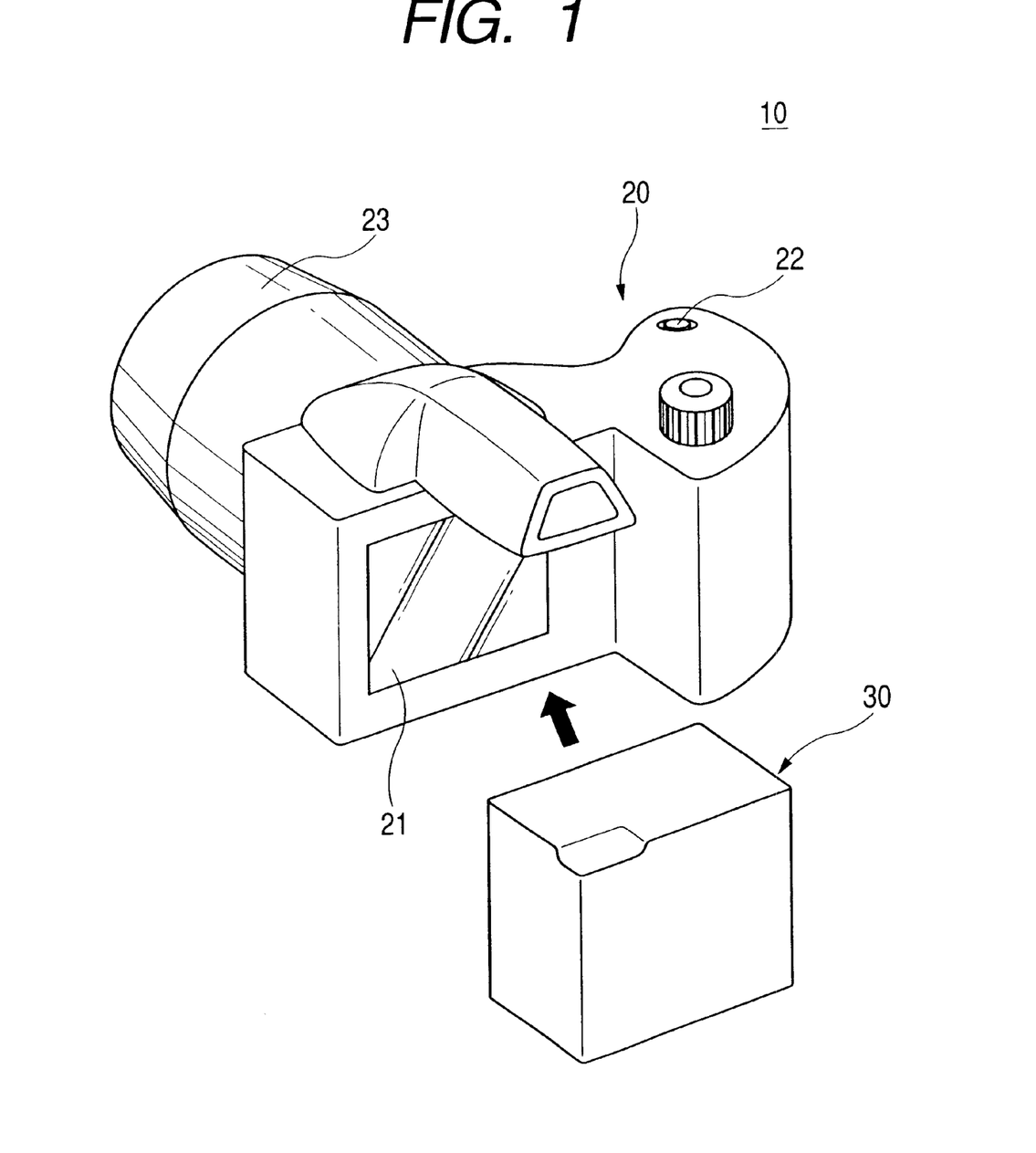
FIG. 1 is an external perspective view showing an embodiment of a film back exchangeable camera to which the invention is applied.
Figure 2:
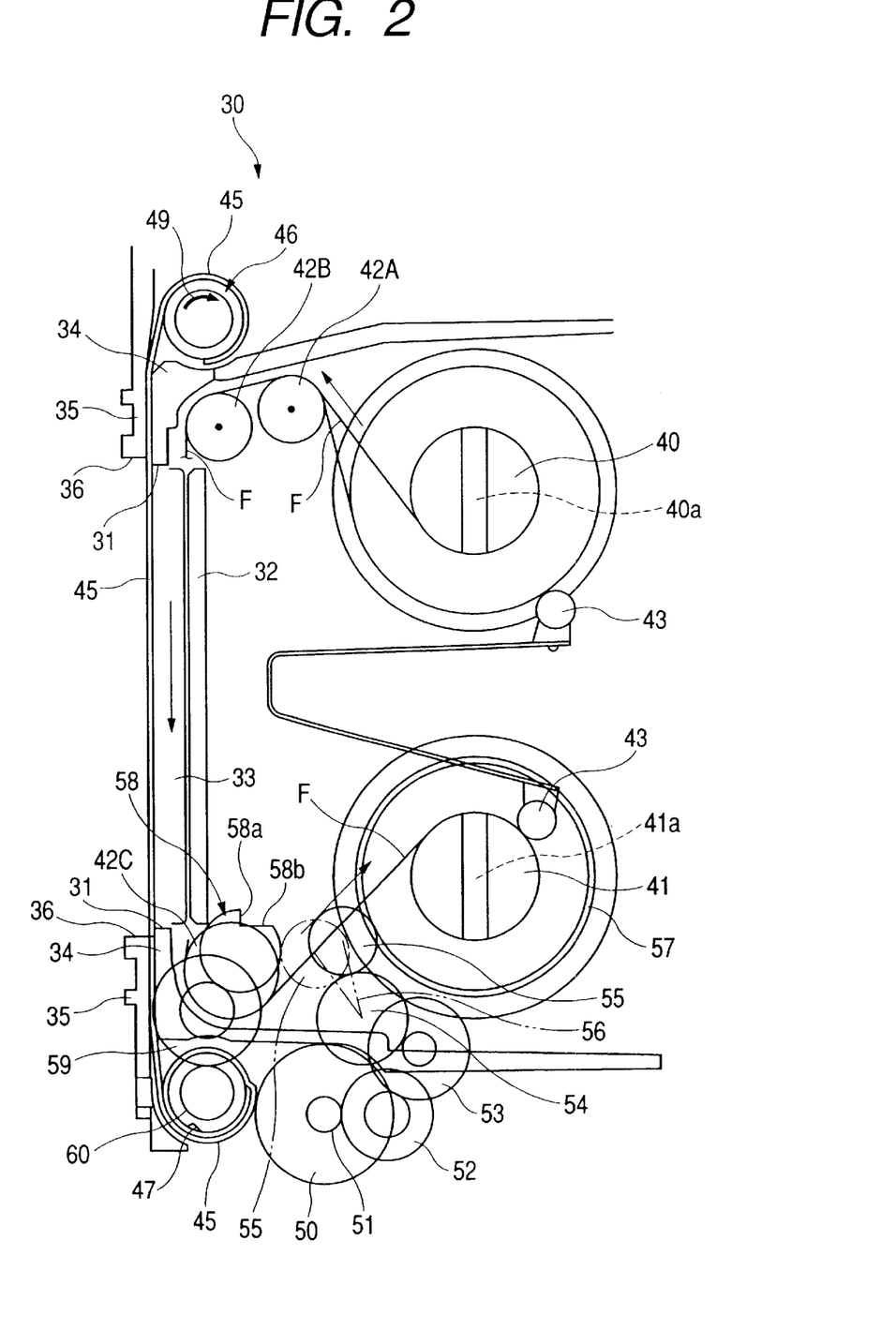
FIG. 2 is a partially sectional side view showing the inside structure of an exchangeable film back of the camera in FIG. 1.
Figure 3:
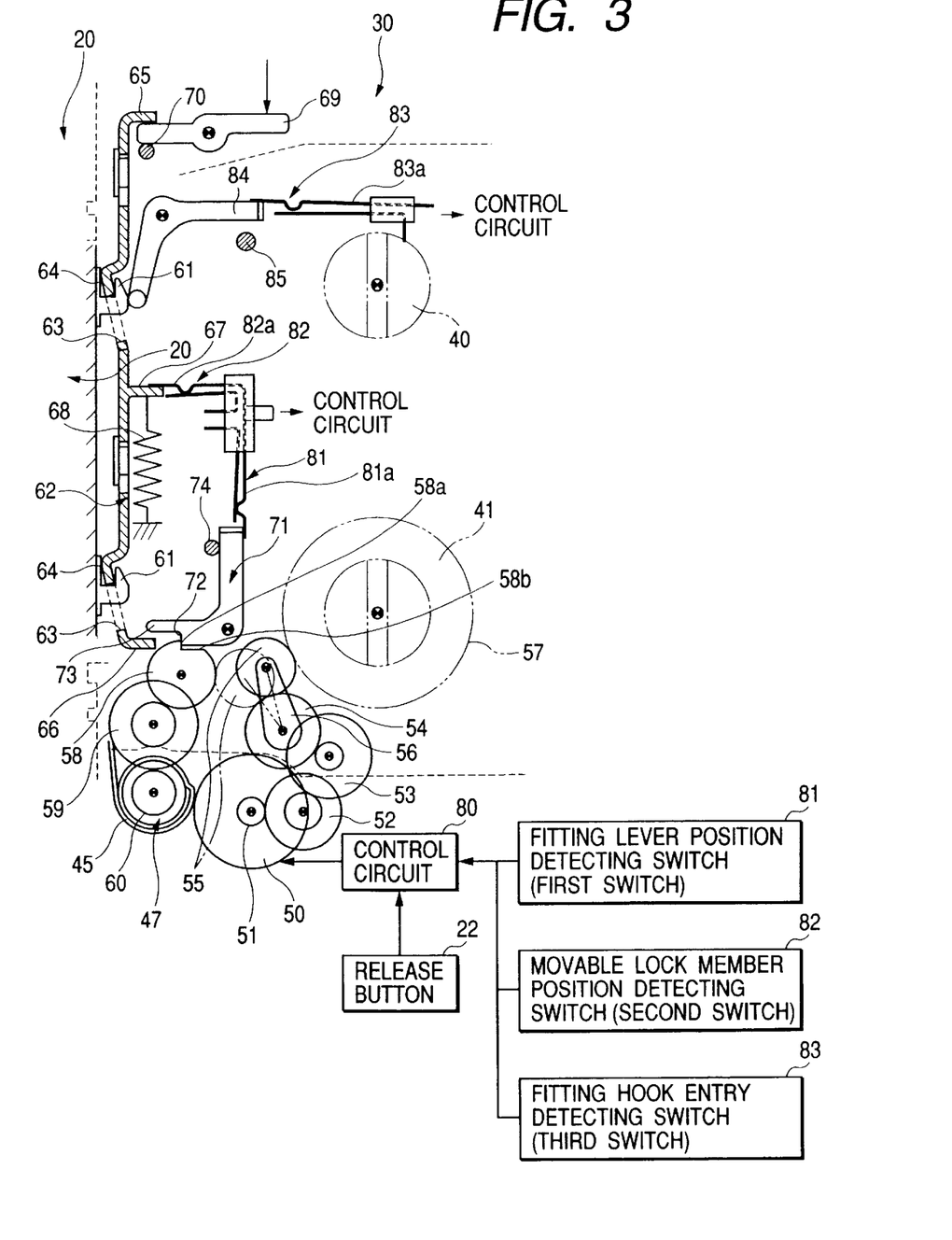
FIG. 3 is a side view showing the inside structure for attaching the exchangeable film back to a camera body in the camera in FIG. 1.

FIG. 1 shows appearance of a film back exchangeable camera 10 in which an exchangeable film back 30 can be attached to and detached from a film body 20, and FIGS. 2 and 3 show the inner structure of the film back 30. In FIGS. 2 and 3, the left side in each figure corresponds to the front side of the camera, and the right side in each figure corresponds to the rear side of the same.

The film back 30 can be attached to and detached from a rear portion of the camera body 20, and is formed at a position opposed to the camera body 20 with a substantially rectangular aperture (through which camera light flux passes) 31 for determining a film exposure region. In the camera body 20, a focal-plane shutter 21 is provided at a position facing the aperture 31. The focal-plane shutter 21 has a front curtain and a rear curtain, and when a release button 22 provided at the top portion of the camera body 20 is depressed to input a shutter release signal, the first curtain and the second curtain are moved with a predetermined time difference. For a time period corresponding to the difference in movement between these front and rear curtains, the light flux having passed through a photographing lens 23 enters through the aperture 31 into the film back 30 so that a film F can be exposed to light.

Inward of the aperture 31, a pressure plate 32 for keeping flatness of the film F is provided. An inner rail 33 located in front of the pressure plate 32 is formed integrally with an outer rail (not shown), and the outer rail comes into contact with the pressure plate 32 to thereby provide a space through which the film F can passes between the inner rail 33 and the pressure plate 32. Since the inner rail 33 and outer rail are located outside the exposure region of the film F., they do not obstruct the photographing light flux. The film F is moved in the film passing space (on a film running surface) between the pressure plate 32 and the inner rail 33 by the following film supplying mechanism.

As shown in FIG. 2, a driven spool 40 and a drive spool 41 are rotatably supported in the film back 30. The driven spool 40 and the drive spool 41 are detachably attached with respect to spool shafts 40a and 41a provided in the film back 30. The film F fed out from the driven spool 40 is guided between the pressure plate 32 and the inner rail 33 by guide rollers 42A and 42B, and led to the drive spool 41 while being guided by a guide roller 42C. The drive spool 41 is linked with a forward/reverse rotation motor 50 through a motor linking switch mechanism, which will be described later, to be rotated in a direction where the film F is wound up (clockwise in FIG. 2). Reference numeral 43 in FIG. 2 is a film pressing roller for holding the film F wound-up on the respective spool 40, 41.

In the film back 30, a shielding curtain (shielding member) 45 is further built so as to be moved at the forward position of the film running surface between the pressure plate 32 and the inner rail 33. In this embodiment, the shielding curtain 45 is located in front of the aperture 31 that determines the film exposure region, and a shielding curtain accommodating space for the shielding curtain 45 is formed between an aperture frame 34 forming the aperture 31 and an outer frame 35 of the film back 30. In the outer frame 3S of the film back 30, an opening portion 36 that is slightly larger than the aperture 31 is formed at a position corresponding to the aperture 31. Further, as long as the shielding curtain 45 is located in front of the film running surface, it may be located backward of the aperture if possible on the constitution.

Figure 4:
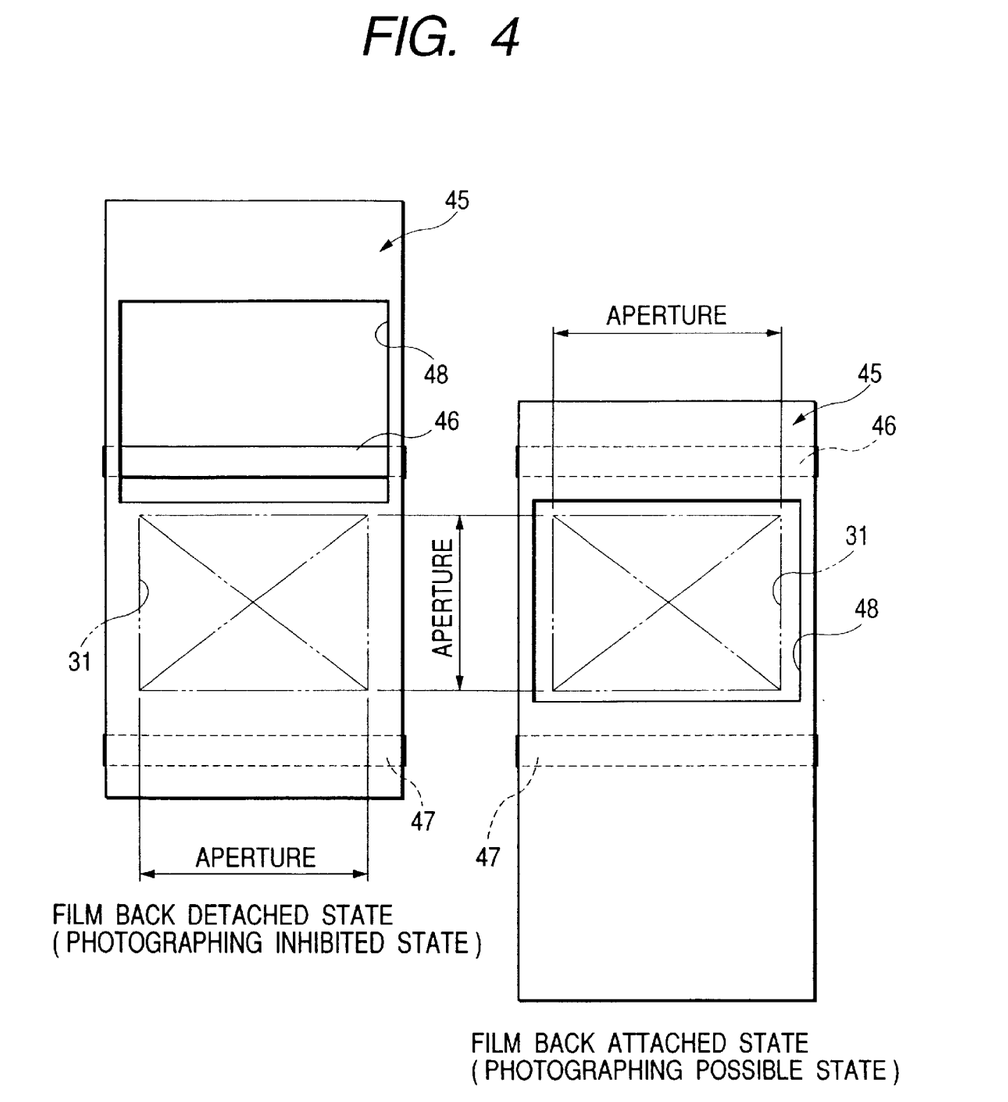
FIG. 4 is a diagram of a shielding curtain viewed from the camera front surface, in which a light shielding state and a light transmissible state are separately shown.

The shielding curtain 45 is a curtain-shaped shielding member, of which both ends are respectively fixed on an energize-winding shaft (first winding shaft) 46 and a driving winding shaft (second winding shaft) 47 that are axially supported to the film back 30. In a developed state as shown in FIG. 4, the shielding curtain 45 has a rectangular shape long in the vertical direction of the camera. The shielding curtain 45 is made of flexible material such as cloth, thin plastic or the like so that it can be wound-up onto and by each winding shaft 46, 47. The shielding curtain 45 is formed with a light transmissible window (light transmissible portion) 48 that is slightly larger than the aperture 31 is formed. The relative position of the light transmissible window 48 with respect to the aperture 31 can be changed, as described below, by changing a ratio of the winding amount on the energize-winding shaft 46 to that on the drive-winding shaft 47, thereby can exchange a shielding state where the film F is not exposed to light and a light transmissible state where the exposure is permitted.

The energize-winding shaft 46 is rotatingly energized by a coil spring (shielding member energizing means) 49 clockwise in FIG. 2. The energize-winding shaft 46 is formed in the shape of a hollow drum, and the coil spring 49 is accommodated within the shaft 46. In FIG. 2, a solid arrow represents the coil spring 49 and the energizing direction thereof. In a state where the shielding curtain 45 is wound up on the energize-winding shaft 46 by the energizing force of the coil spring 49, the light transmissible window 48 retreats from the position corresponding to the aperture 31, and the aperture 31 is covered with the shielding curtain 45, so that the inside of the film back 30 at the backside of the aperture 31 is shielded from the light. A left figure on FIG. 4 shows the shielding state of the shielding curtain 45. Though the upper portion of the shielding curtain 45 is actually wound-up on the energize-winding shaft 46, FIG. 4 shows the shielding curtain 45 in the developed state in order to illustrate the state where the light transmissible window 48 has retreated.

On the other hand, when the drive-winding shaft 47 is linked with the forward/reverse rotation motor 50 through the motor linking switch mechanism which will be described later, the shaft 47 is rotated in a direction where the shielding film 45 is wound up (counterclockwise in FIG. 2) thereon against the energizing force of the coil spring 49 acting on the energize-winding shaft 46. When the shielding curtain 45 is wound up on the drive-winding shaft 47, as shown in a right figure of FIG. 4, the light transmissible window 48 is moved to the position corresponding to the aperture 31, so that the film F on the pressure plate 32 can be exposed to the light. Namely, the light transmissible state is established for the inside of the film back.

The forward/reverse rotation motor 50 is a drive source for rotating the above drive spool 41 in the film winding-up direction by the counterclockwise rotation (hereinafter referred to as a forward rotation) of a motor pinion 51 provided to an output shaft of the motor, and for rotating the above drive-winding shaft 47 in the shielding curtain winding direction by the clockwise rotation of the motor pinion 51 (hereinafter referred to as a reverse rotation). The forward/reverse rotation motor 50 in this embodiment is provided in the film back 30. The rotation of the motor pinion 51 is transmitted through two reduction gears 52, 53 to a sun gear 54. The sun gear 54 meshes with a planet gear 55, and a rotational axis of the planet gear 55 is supported to a rotational axis of the sun gear 54 by a planet support arm 56. Accordingly, the planet gear 55, in a state where its movement in the peripheral direction of the sun gear 54 (i.e. an revolving operation) is permitted, revolves around the sun gear 54 in the same direction as the rotational direction of the sun gear 54 when the sun gear 54 rotates. In a state where the revolving operation is restricted, the planet gear 55 is rotated about its axis in the direction opposite to the rotational direction of the sun gear 54.

The planet gear 55 engages with either one of a spool gear 57 provided to the drive spool 41 and a single rotation cam gear 58 through the above revolving operation. The planet gear 55 engages with the spool gear 57 when the forward/reverse rotation motor 50 rotates forward. Therefore, the drive spool 41 rotates clockwise in FIG. 2 by being linked with the forward/reverse rotation motor 50. The drive spool 41 winds up the film F by its clockwise rotation.

On the other hand, when the forward/reverse rotation motor 50 rotates reversely, the planet gear 55 engages with the single rotation cam gear 58, and a winding shaft gear 60 is rotated counterclockwise in FIG. 2 through a reduction gear 59 engaging with the single rotation cam gear 58. The winding shaft gear 60 is a gear formed integrally with the drive-winding shaft 47; and when the gear 60 is linked with the forward/reverse rotation motor 50 through the planet gear 55, the gear 60 rotates the drive-winding shaft 47 thereby to cause the shaft 47 to perform the aforesaid shielding curtain winding operation. The shielding curtain winding operation by the drive-winding shaft 47, that is, shifting from the shielding state to the light transmissible state is completed while the single rotation cam gear 58 rotates once (one turn) counterclockwise from the position shown in FIG. 2 or 3.

When the reverse rotation of the forward/reverse rotation motor 50 is stopped,. the drive force is not supplied to the drive-winding shaft 47. At this time, if the gear mechanism from the single rotation cam gear 58 to the drive-winding shaft 47 (shielding member driving mechanism) can be freely rotated in the opposite direction to that at the motor linking state, the shielding curtain 45 is wound on the energize-winding shaft 46 by the energizing force of the coil spring 49, so that the film bag returns to the above shielding state. On the other hand, in case that the free rotation of the gear mechanism is restricted the light transmissible state where the light transmissible window 48 is located overlapping with the aperture 31 is kept. To say concretely, when the film back 30 is attached and locked to the camera body 20, the rotation of the drive-winding shaft 47 in the direction where the shielding curtain 45 is drawn out (winding is released) is restricted and the light transmissible state is kept. When the lock is released in order to detach the film back 30 form the camera body, the restriction of free rotation is released, and the shielding curtain 45 is wound up on the energize-winding shaft 46, so that the camera bag is put into the shielding state. The constitution for controlling the movement of the shielding curtain 45 according to attachment and detachment of the film back 30 to the camera body 20 as described above will be described below.

FIG. 3 shows a lock mechanism for locking the film back 30 with respect to the camera body 20. At the rear portion of the camera body 20, a pair of fitting hooks 61 are provided, which are located in the different positions in the vertical direction of the camera. Illustration of the fitting hook 61 is omitted in FIG. 1. Each fitting hook 61 is formed in an asymmetrical shape in which it is extended backward of the camera body 20 and bent upward. On the other hand, in the film back 30, a movable lock member 62 having a pair of hook inserted holes 63 into which these fitting hooks 61 can be inserted is provided. The movable lock member 62 has a pair of the hook inserted holes 63 surrounded by a pair of protrude-fitting portions 64 which protrude on the camera body 20 side. Further, at upper and lower, end portions, the movable lock member 62 has an operated arm 65 and an unlock linking arm 66 that are bent backward. Further, the movable lock member 62 has a switch operating arm 67 between a pair of the protrude-fitting portions 64.

The movable lock member 62 is supported movably in the vertical direction in FIG. 3, and energized by a lock member energizing spring 68 to move toward the lower side (to a lock position). In the film back 30, an unlock operating member 69 for moving the movable lock member 62 upward (to an unlock position) against the energizing force of this lock member energizing spring 68 is axially supported. One end portion of the unlock operating member 69 comes into contact with the operated arm 65 of the movable lock member 62. In a non-operation state where external force is not applied, the unlock operating member 69 is held in a rotational position where it comes contact with a stopper 70 by the action of the movable lock member 62 energized downward. When the unlock operating member 69 is rotated clockwise in FIG. 3 against the energizing force of the lock member energizing spring 68, the member 69 presses the operated arm 65 upward in the figure to move the movable lock member 62 to the unlock position. The unlock operating member 69 can be operated from the outside of the film back 30.

When the film back 30 is attached to the camera body 20, the film back 30 is moved to the left in FIG. 3. At this time, since the movable lock member 62 is held down at the lock position where it receives the energizing force of the lock member energizing spring 68, a pair of the protrude-fitting portions 64 comes respectively into contact with a pair of the fitting hooks 61 on the camera body 20 side. At the contact portion of the fitting hook 61 and the protrude-fitting portion 64, such a slant shape is provided that force which causes the movable lock member 62 to move upward by the leftward movement of the film back 30 in the figure occurs. Therefore, in case that. the movement of the film back 30 to the attaching direction is continued, the movable lock member 62 is moved upward, and a pair of the fitting hooks 61 enter into the corresponding hook inserted holes 63. When the slant contacting portion of each fitting hook 61 gets over the protrude-fitting portion 64 completely, the movable lock member 62 that has been lifted upward returns to the downward lock position by the lock member energizing spring 68, so that the fitting hooks 61 are fitted to the protrude-fitting portions 64 as shown in FIG. 3. By this fitting, the film back 30 is supported so as not to be removed from the camera body 20. Further, in the front surface of the film back 30, a hole (not shown) is provided in order to cause the fitting hook 61 to enter into the fitting position to the movable lock member 62.

When the film back 30 is detached from the camera body 20, the unlock operating member 69 is rotated clockwise as described before. Then, the movable lock member 62 moves to the unlock position, and the fitting hooks 61 are released from the protrude-fitting portions 64. Since a pair of the fitting hooks 61 can be pulled out from the hook inserted holes 63 by the upward movement of the movable lock member 62, the film back 30 can be moved to the right in the figure to be detached from the camera body 20.

Further, in the film back 30, a bent portion of an L-shaped fitting lever 71 is axially supported in the vicinity of the single rotation cam gear 58. The fitting lever 71 has a cam gear fitting portion 72 and a pressed portion 73 that extend in the vicinity of the single rotation cam gear 58.

The single rotation cam gear 58 has a fitting cam surface 58a and a press cam surface 58b that are orthogonal to each other being cut off the periphery. When the fitting lever 71 is in the rotational position (fitting position) in FIG. 3, the cam gear fitting portion 72 is fitted to the fitting cam surface 58a, so that the clockwise rotation of the single rotation cam gear 58 is restricted. When the clockwise rotation of the single rotation cam gear 58 is restricted, as described before, the rotation of the drive-winding shaft 47 in the direction where the winding of the shielding curtain 45 is released is restricted , so that the shielding curtain 45 cannot be wound on the energize-winding shaft 46 even by the energizing force of the coil spring 49. Namely, the light transmissible state where the shielding curtain 45 has been wound on the drive-winding shaft 47 can be kept. The fitting lever 71, in a state where an external force is not applied, is held between an elastic switch contact 81a and a stopper 74.

The pressed portion 73 is pushed by the unlock linking arm 66 by the movement of the movable lock member 62 in the unlock direction, so that the fitting lever 71 rotates clockwise in FIG. 3. This allows the cam gear fitting portion 72 to be separated from the fitting cam surface 58a releasing the restriction of rotation with respect to the single rotation cam gear 58. When the fitting release occurs, the clockwise rotation of the drive-winding shaft 47 is permitted. Therefore, in case that the shielding curtain 45 has been wound up on the drive-winding shaft 47, it is wound on the energize-winding shaft 46 by action of the coil spring 49, so that the film bag enters in the shielding state.

To the contrary, when the reverse rotation of the forward/reverse rotation motor 50 is transmitted through the planet gear 55 to the single rotation cam gear 58, the press cam surface 58b pushes up the fitting lever 71, so that the fitting lever 71 retreats clockwise from the fitting position in FIG. 3. Therefore, regardless of the position of the fitting lever 71, the single rotation cam gear 58 can rotates counterclockwise.

According to the above constitution, when the forward/reverse drive motor 50 is driven to rotate reversely, the shielding curtain 45 is in the light transmissible state; and when the drive of the motor reverse rotation is stopped, the shielding curtain 45 is kept in the light transmissible state or returned to the shielding state depending on the position of the fitting lever 71, that is, being in the fitting position or the fitting release position. The fitting position and fitting release position of the fitting lever 71 correspond to the lock position and unlock position of the movable lock member 62. Therefore, in the lock state between the camera body 20 and the film back 30, the light transmissible state where the photographing is possible is kept; and in the unlock state, the shielding curtain 45 can be immediately returned to the shielding state by the coil spring 49.

Then, the constitution for drive-controlling the forward/reverse rotation motor 50 will be described. In the film back 30, a fitting lever position detecting switch (first switch) 81, a movable lock member position detecting switch (second switch) 62, and a fitting hook entry detecting switch (third switch) 83 are provided. Each of the switches 81, 82 and 83 is composed of a pair of switch contacts, at least one of which is an elastic switch contact (81a, 82a, 83a) and is elastically transformable.

An end portion of the fitting lever 71 on the opposite side to the cam gear fitting portion 72 side comes into contact with the elastic switch contact 81a of the fitting lever position detecting switch 81. The fitting lever position detecting switch 81 conducts when the fitting lever 71 is in the above fitting position; and when the fitting lever 71 is rotated to the fitting release position, the elastic switch contact 81a is pressed by the fitting lever 71 and the conduction is released.

When the movable lock member 62 moves from the lock position to the unlock position, the switch operating arm 67 presses up the elastic switch contact 82a, so that the conduction of the movable lock member position detecting switch 82 is released. When the movable lock member 62 returns to the lock position, the elastic switch contact 82a is released from the pressure, so that the movable lock member position detecting switch 82 conducts.

One end portion of a junction lever 84 comes into contact with the elastic switch contact 83a of the fitting hook entry detecting switch 83. The junction lever 84 is L-shaped and attached in the film back 30 at its bending portion. In a state where the external force is not applied to the junction lever 84, the junction lever 84 is kept by the elastic switch 83a in the rotational position where it comes into contact with a stopper 85, and the fitting hook entry detecting switch 83 conducts. When the film back is attached to the camera body 20, the fitting hook 61 enter s to the fitting position of the movable lock member 62, and the junction lever 84 is pressed rightward in FIG. 3 and rotate s counterclockwise. By the rotation of the junction lever 84, the elastic switch contact 83a is pressed upward, so that the conduction of the fitting hook entry detecting switch 83 is released. FIG. 3 shows this conduction release state.

The switches 81, 82 and 83 are connected to a control circuit 80 provided in the film back 30. The control circuit 80 controls the forward/reverse rotation motor 50 through a motor driver (not shown) or the like. Further, when the film back 30 is attached to the camera body 20, the control circuit 80 on the film back 30 side and a circuit in the camera body 20 are connected to each other through a connector (not shown), and a shutter release signal and the like are also input to the control circuit 80 by pressing of the release button 22.

An operation of the film back exchangeable camera 10 having the above constitution will be described as follows. In a state where the film back 30 is detached from the camera body 20, the shielding curtain 45 is wound up on the energize-winding shaft 46, and the shielding curtain 45 covers the front of the aperture 31. Therefore, the inside of the film back 30 is in the shielding state. At this time, the fitting lever position detecting switch 81, the movable lock member position detecting switch 82, and the fitting hook entry detecting switch 83 conduct respectively.

When the film back 30 is attached to the camera body 20, a pair of the fitting hooks 61 are inserted into the hook inserted holes 63 of the movable-lock member 62 and fitted to the protrude-fitting portions 64. At this time, one of the fitting hooks 61 presses the junction lever 84 thereby to release the conduction of the fitting hook entry detecting switch 83, Further, the movable lock member 62 is once moved in the unlock direction by the insertion of the fitting hook 61 and then returns to the lock position. The fitting lever position detecting switch 81 and the movable lock member position detecting switch 82 get back to the conductive state again after their conduction is once released. Th e state that the film back 30 is attached to the camera body 20 is shown in FIG. 3.

When the state is detected as the fitting lever position detecting switch 81 and the movable lock member position detecting switch 82 conduct and the conduction of the fitting hook entry detecting switch 83 is released, the control circuit 80 causes the forward/reverse drive motor to rotate reversely. The input state of the three switches at this time means that the film back 30 is exactly attached to the camera body 20 and locked by the lock mechanism. And, by the motor reverse rotation, the planet gear 55 engages with the single rotation cam gear 58 and attempts to rotate the cam gear 58 counterclockwise in FIG. 3. As described before, the single rotation cam gear 58 can always perform the counterclockwise rotation in linking with the motor reverse rotation with the press cam surface 58b pressing up the fitting lever 71. Then, the drive-winding shaft 47 is rotated in the shielding curtain winding direction, the shielding curtain 45 is wound against the coil spring 49, and the light transmissible window 48 overlaps with the aperture 31. The fitting lever 71 is pressed by the press cam surface 58b and rotated to the fitting release position, so that the conduction of the fitting lever position detecting switch 81 is released. When the single rotation cam gear 58 almost performs one rotation and the fitting cam surface 58a returns to the position where it is fitted to the cam gear fitting portion 72, the fitting lever 71 returns to the fitting position and causes the fitting lever position detecting switch 81 to conduct again. Driving of the reverse rotation of the forward/reverse rotation motor 50 is stopped when this re-conduction of the fitting lever position detecting switch 81 has been detected. Since the fitting lever 71 returns to the fitting position, the rotation of the single rotation cam gear 58 is restricted in the opposite direction to the motor reverse rotation so that the shielding curtain 45 cannot be wound by the energize-winding shaft 46. Accordingly, the shielding curtain 45 is kept in the light transmissible state. At this time, since the film back 30 is locked in the camera body 20, even if the shielding curtain 45 is in the light transmissible state, as long as the focal-plane shutter 21 on the camera body 20 side is not opened, the film F is not exposed to light.

When the release button 22 is depressed for photographing, the focal plane shutter 21 moves and the film F on the pressure plate 32 is exposed to light. After the exposure is completed, the control circuit 80 drives the forward/reverse rotation motor 50 to rotate it forward. Then, the planet gear 55 engages with the spool gear 57 and the drive spool 41 is driven and rotated in the film winding direction. When the winding operation of one film frame is completed, the control circuit 80 stops the forward/reverse rotation motor 50. Since the mechanism and technique for controlling an automatic film winding operation after the exposure is known, its description is omitted here. The exposing operation and the film winding operation by the forward/reverse rotation motor 50 can be sequentially performed repeatedly. Further, the forward rotation of the motor for film winding may be started by manual operation using an operation member separately provided.

When the unlock operating member 69 is rotated clockwise in FIG. 3, the film back 30 is detached from the camera body 20. Then, the movable lock member 62 is moved from the lock position to the unlock position. By this movement of the movable lock member 62, the unlock linking arm 66 presses up the pressed portion 73 and rotates the fitting lever 71 to the fitting release position. In the light transmissible state, the fitting of the cam gear fitting portion 72 to the fitting cam surface 58*a* restricts winding of the shielding curtain 45 on the energize-winding shaft 46. However, by the retreat of the fitting lever 71, the above winding restriction is released, so that the clockwise rotation of the drive-winding shaft 47 is permitted. Accordingly, as soon as the fitting of the cam gear fitting portion 72 to the fitting cam surface 58*a* is released, the shielding curtain 45 is wound on the energize-winding shaft 46 by the energizing force of the coil spring 49 and the aperture 31 is covered, so that the film bag enters in the shielding state. For detaching the film back 30, the unlock operating member 69 is operated and thereafter the film back 30 is moved backward of the camera, that is, the operations of two steps are performed. However, according to the present embodiment, when the unlock operating member 69 is operated, the shielding curtain 45 shifts to the shielding state by spring restoring force almost simultaneously. Therefore, in a state where the film back 30 is detached, the aperture 31 has been already covered with the shielding curtain 45, so that there is no fear that the film F maybe exposed to light undesirably. When the shielding curtain 45 has been wound on the energize-winding shaft 46, the single rotation cam gear 58 performs almost one rotation and returns to the position shown in FIG. 3. And, when the unlock operation of the unlock operating member 69 is stopped, the fitting lever 71 returns again to the fitting position, and the cam gear fitting portion 72 and the fitting cam surface 58*a* are fitted to each other.

When the film back 30 is detached from the camera body 20, the pressure of the fitting hook 61 to the junction lever 84 is released, so that the fitting hook entry detecting switch 83 conducts. Further, when the unlock operation of the unlock operating member 69 is stopped, the movable lock member 62 returns to the lock position, so that the movable lock member position detecting switch 82 conducts. Further, since the fitting lever 71 returns to the fitting position, the fitting lever position detecting switch 81 also conducts. Namely, all the switches 81, 82 and 83 return to the conductive state.

As described above, in the film back exchangeable camera in this embodiment, when the film back 30 is attached to the camera body 20 and locked therein, the shielding curtain 45 is automatically wound in order to make the inside of the film back in the light transmissible state (photographable state). Therefore, there is no fear that the shutter release moment is missed because the photographer has failed to detach the shielding plate. Since the winding of the shielding curtain 45 for the light transmissible state is performed by the forward/reverse rotation motor 50 used also in film supply, so that an independent drive source is not required. Further, the return operation of the shielding curtain 45 to the shielding state is immediately performed by the energizing force of the coil spring 49 according to the unlock operation of the film back 30. Therefore, the film back can be reliably put into the shielding state without any adverse influence such as a bad condition of the motor, the insufficient residual amount of the power supply, or the like, and there is no fear that the film F is undesirably exposed to light. Further, since the shielding curtain 45 is built in the film back 30, there is no fear of losing it.

Though the invention has been described above with reference to the illustrated embodiment, the invention should not be limited to the embodiment. For example, though the shielding member is the shielding curtain 45 wound on the winding shafts 46 and 47 in this embodiment, it may be a plate-like shielding member that can move between a shielding position and a retreat position if a retreat space is provided in the film back.

Further, in this embodiment, the forward/reverse rotation motor 50 and the control circuit 80 are provided in the film back 30. However, they may be mounted on the camera body side. In this case, when the film back is attached to the camera body, the pinion of the forward/reverse rotation motor should engage with a first gear (52) of a gear train in the film back 30 and switches (81, 82 and 83) in the filmback 30 should be connected to a control circuit in the camera body.

According to the present invention, a shielding member adapted to release a light transmissible state using driving force of a film supply motor is built in a film back. Therefore, the load on the photographer for exchanging the film back can be reduced, and particularly, the possibility of missing the shutter release moment after the film back is exchanged is reduced. Further, since the shielding member is built in the film back, there is also no fear that the shielding member is lost. Further, energizing means for energizing the shielding member in the shielding direction is provided, whereby the sure shielding is obtained when the film back is detached from the camera body.

What is claimed is:

1. A film back exchangeable camera having a camera body and a film back that can be attached to and detached from the camera body, the camera comprising:

an aperture formed in the film back, through which photographing light flux passes;

a film supplying mechanism that moves a film along a film running surface defined at a rear of the aperture;

a shielding member, which is built in the film back and located movably in front of the film running surface and which is movable between a shielding state where a film is not exposed to light and a light transmissible state where the light is transmissible to the film to expose the film;

a shielding member driving mechanism that moves the shielding member from the shielding state to the light transmissible state;

a forward/reverse rotation motor; and a motor linking switch mechanism by which the forward/reverse rotation motor is switchingly linked with either one of the film supplying mechanism and the shielding member driving mechanism according to a forward rotation and a reverse rotation of the forward/reverse rotation motor, wherein the film supply is executed by the forward rotation of the forward/reverse rotation motor, and the shielding member is moved from the shielding state to the light transmissible state by the reverse rotation of the forward/reverse rotation motor.

2. The camera according to claim 1 further comprising:
shielding member energizing means for energizing the shielding member to the shielding state.

3. The camera according to claim 2, wherein:
the shielding member is constituted as a curtain-shaped member having a light transmissible portion of a size corresponding to a size of the aperture of-the film back;
the film back includes:
  a first winding shaft to which one end portion of the shielding member is fixed, the first winding shaft being rotatingly energized by the shielding member energizing means in a direction in which the shielding member is wound up thereon; and
  a second winding shaft to which the other end of the shielding member is fixed, the second winding shaft adapted to be rotated by the reverse rotation of the forward/reverse motor in a direction in which the shielding member is wound up thereon;
when the shielding member is wound up on the first winding shaft, the light transmissible portion retreats from a front position of the film running surface so that the shielding state is established; and
when the shielding member is wound up on the second winding shaft, the light transmissible portion is located at the front position of the film running surface so that the light transmissible state is established.

4. The camera according to claim 1, wherein the motor linking switch mechanism includes a planet gear selectively meshing with either one of a gear for the film supplying mechanism and a gear for the shielding member driving mechanism side according to the forward rotation and reverse rotation of the forward/reverse rotation motor.

5. The camera according to claim 1, further comprising:
lock means for locking the film back in the camera body in a state where the film back is mounted on the camera body; and
lock linking keeping means for keeping the shielding member in the light transmissible state even if the reverse rotation of the forward/reverse rotation motor is stopped in a lock state where the film back is locked in the camera body by the lock means, and permitting the shielding member to be moved from the light transmissible state to the shielding state in an unlock state of the lock means.

6. The camera according to claim 5, wherein:
the lock means includes:
  a fitting hook provided to the camera body, and adapted to enter into the film back when the film back is attached;
  a movable lock member provided to the film back and adapted to be moved between a lock position where the movable lock member is fitted to the fitting hook and an unlock position where the movable member is released from being fitted to the fitting hook; and
  lock member energizing means for energizing the movable lock member to be moved to the lock position; and
the lock linking keeping means includes:
  a cam gear forming at least a part of the shielding member driving mechanism, wherein the cam gear is rotated in a predetermined first direction to move the shielding member to the light transmissible state when the cam gear is linked with the reverse rotation of the forward/reverse rotation motor, and the cam gear is rotated in a second direction opposite to the first direction while following the movement of the shielding member from the light transmissible state to the shielding state; and
  a fitting lever rotatable between a fitting position where the fitting lever restricts the rotation of the cam gear in the second direction, and a fitting release position where the fitting lever permits the rotation of the cam gear in the second direction, wherein the fitting lever is kept in the fitting position when the movable lock member is in the lock position, and the movement of the movable lock member toward the unlock position causes the fitting lever to be rotated to the fitting release position.

7. The camera according to claim 6, wherein when the cam gear is rotated in linking with the. reverse rotation of the forward/reverse rotation motor, the fitting lever is pressed by the cam gear to be rotated to the fitting release position until the cam gear is rotated one turn to return the fitting lever to the fitting position.

8. The camera according to claim 6, further comprising:
a first switch for detecting the fitting position and fitting release position of the fitting lever;
a second switch for detecting the lock position and unlock position of the movable lock member;
a third switch for detecting the entry of the fitting hook provided to the camera body into a fitting position where the fitting hook is fitted to the movable lock member; and
control means which, on condition that the fitting position of the fitting lever, the lock position of the movable lock member, and the entry of the fitting hook are simultaneously detected by these switches, executes the reverse rotation of the forward/reverse rotation motor to move the shielding member to the light transmissible state.

9. The camera according to claim 1, wherein the film is wound up by the forward rotation of the forward/reverse rotation motor.

10. An exchangeable film back that can be attached to and detached from a camera body, the film back comprising:
an aperture through which photographing light flux passes;
a film supplying mechanism that moves a film along a film running surface defined at a rear of the aperture;
a shielding member located movably in front of the film running surface and movable between a shielding state where a film is not exposed to light and a light transmissible state where the light is transmissible to the film to expose the film;
a shielding member driving mechanism that moves the shielding member from the shielding state to the light transmissible state; and
a motor linking switch mechanism driven by a forward/reverse rotation motor to selectively activate either one of the film supplying mechanism and the shielding member driving mechanism according to a forward rotation and a reverse rotation of the forward/reverse rotation motor,
wherein the film supply is executed by the forward rotation of the forward/reverse rotation motor, and the shielding member is moved from the shielding state to the light transmissible state by the reverse rotation of the forward/reverse rotation motor.

11. The film back according to claim 10, further comprising:
shielding member energizing means for energizing the shielding member to the shielding state.

* * * * *